(12) United States Patent
Ngan et al.

(10) Patent No.: US 9,672,412 B2
(45) Date of Patent: Jun. 6, 2017

(54) REAL-TIME HEAD POSE TRACKING WITH ONLINE FACE TEMPLATE RECONSTRUCTION

(71) Applicant: THE CHINESE UNIVERSITY OF HONG KONG, Hong Kong (CN)

(72) Inventors: King Ngi Ngan, Hong Kong (CN); Songnan Li, Guang Dong (CN)

(73) Assignee: THE CHINESE UNIVERSITY OF HONG KONG, Shatin, New Territories (HK)

( * ) Notice: Subject to any disclaimer, the term of this patent is extended or adjusted under 35 U.S.C. 154(b) by 527 days.

(21) Appl. No.: 14/313,639

(22) Filed: Jun. 24, 2014

(65) Prior Publication Data

US 2015/0371080 A1 Dec. 24, 2015

(51) Int. Cl.
*G06K 9/00* (2006.01)
(52) U.S. Cl.
CPC .................. *G06K 9/00261* (2013.01)
(58) Field of Classification Search
None
See application file for complete search history.

(56) References Cited

U.S. PATENT DOCUMENTS

| | | | | |
|---|---|---|---|---|
| 5,280,530 A * | 1/1994 | Trew | ..................... | G01S 3/7864 348/14.16 |
| 7,117,157 B1 * | 10/2006 | Taylor | ..................... | G06F 3/012 704/246 |
| 2002/0012454 A1 * | 1/2002 | Liu | ..................... | G06K 9/00201 382/118 |
| 2003/0103648 A1 * | 6/2003 | Ito | ..................... | G08B 13/19602 382/103 |
| 2003/0169907 A1 * | 9/2003 | Edwards | ............ | G06K 9/00248 382/118 |
| 2008/0298643 A1 * | 12/2008 | Lawther | ............ | G06F 17/30256 382/118 |
| 2009/0074238 A1 * | 3/2009 | Pfister | ..................... | G06T 7/77 382/100 |

(Continued)

OTHER PUBLICATIONS

Zhu, Zhiwei, and Qiang Ji. "Real time 3d face pose tracking from an uncalibrated camera." In Computer Vision and Pattern Recognition Workshop, 2004. CVPRW'04. Conference on, pp. 73-73. IEEE, 2004.*

(Continued)

*Primary Examiner* — Sumati Lefkowitz
*Assistant Examiner* — Carol Wang
(74) *Attorney, Agent, or Firm* — Knobbe Martens Olson and Bear, LLP

(57) ABSTRACT

Provided are methods and apparatus for tracking a head pose with online face template reconstruction. The method comprises the steps of retrieving a plurality of frames of images of the user; comparing each of the retrieved frames with a predetermined face template to determine one or more head poses that are monitored successfully and obtain head pose information of the determined one or more head poses; and reconstructing, during the step of comparing, the face template from the obtained head pose information; wherein the reconstructed face template is compared with subsequently retrieved images such that the head poses of the user are tracked in time.

19 Claims, 3 Drawing Sheets

(56) References Cited

U.S. PATENT DOCUMENTS

| | | | | |
|---|---|---|---|---|
| 2009/0097705 | A1* | 4/2009 | Thorn | G06Q 10/02 |
| | | | | 382/103 |
| 2009/0262213 | A1* | 10/2009 | Watanabe | G06K 9/00295 |
| | | | | 348/222.1 |
| 2011/0025836 | A1* | 2/2011 | Tamaki | B60R 11/04 |
| | | | | 348/78 |
| 2011/0063403 | A1* | 3/2011 | Zhang | G06K 9/00261 |
| | | | | 348/14.1 |
| 2011/0281644 | A1* | 11/2011 | Kawamoto | G06T 19/006 |
| | | | | 463/30 |
| 2012/0051658 | A1* | 3/2012 | Tong | G11B 27/034 |
| | | | | 382/224 |
| 2012/0169887 | A1* | 7/2012 | Zhu | G06T 7/75 |
| | | | | 348/207.1 |
| 2012/0293635 | A1* | 11/2012 | Sharma | G06K 9/00234 |
| | | | | 348/50 |
| 2013/0329951 | A1* | 12/2013 | Kannan | G06T 7/2046 |
| | | | | 382/103 |
| 2014/0009465 | A1* | 1/2014 | Shen | G06T 13/40 |
| | | | | 345/420 |

OTHER PUBLICATIONS

Xiao, Jing, Tsuyoshi Moriyama, Takeo Kanade, and Jeffrey F. Cohn. "Robust full-motion recovery of head by dynamic templates and re-registration techniques." International Journal of Imaging Systems and Technology 13, No. 1 (2003): 85-94.*

* cited by examiner

REAL-TIME HEAD POSE TRACKING WITH ONLINE FACE TEMPLATE RECONSTRUCTION

TECHNICAL FIELD

The present application relates to methods and apparatus for tracking head pose of the user.

BACKGROUND

To develop a practical head pose tracking method, not only accuracy but also time-efficiency and robustness should be taken into account.

A RGB-Depth camera may provide both color and depth information of a scene captured thereby. Most previous head pose estimation/tracking methods merely use the color information. As RGB-Depth camera becomes affordable, more and more researches are focused on depth information, which is more immune to the illumination changes and therefore makes the head pose tracking across adjacent frames robust. One class of depth-based head pose estimation works on a frame-by-frame basis, but typically has a lower accuracy and a higher complexity. Other classes involve a process of using sparse face model consisting of dozens of face vertices, or using dense face template consisting of thousands of vertices to track the head pose. However, such face template is either reconstructed offline or extracted from the first frame of the depth video, which will make the pose estimation less practical and less robust.

SUMMARY

According to an aspect of the present application, there is disclosed a method for tracking a head pose. The method may comprise a step of retrieving a plurality of frames of images of the user; a step of comparing each of the retrieved frames with a predetermined face template to determine one or more head poses that are monitored successfully and obtain head pose information of the determined one or more head poses; and a step of reconstructing, during the step of comparing, the face template from the obtained head pose information. In one embodiment, the reconstructed face template is compared with subsequently retrieved images such that the head poses of the user are tracked in time.

According to another aspect of the present application, there is disclosed an apparatus for tracking a head pose. The apparatus may comprise a retriever, a comparator, and a reconstructor. The retriever is configured to retrieve a plurality of frames of images of the user, the comparator is configured to compare each of the retrieved frames with a predetermined face template to determine one or more head poses that are monitored successfully and obtain head pose information of the determined one or more head poses. In addition, the reconstructor is configured to reconstruct the face template from the obtained head pose information. According to one embodiment of the present application, the reconstructed face template is compared by the comparator with images retrieved subsequently by the retriever such that the head poses of the user are tracked in time.

According to an aspect of the present application, a storage media for storing instructions run by a computer or a processor to track a head pose by:
retrieving a plurality of frames of images of the user;
comparing each of the retrieved frames with a predetermined face template to determine one or more head poses that are monitored successfully and obtain head pose information of the determined one or more head poses; and
reconstructing, during the step of comparing, the face template from the obtained head pose information;
wherein the reconstructed face template is compared with subsequently retrieved images such that the head poses of the user are tracked in time.

In further aspect of the present application, the application further proposes a system for tracking a head pose, comprising:
means for retrieving a plurality of frames of images of the user;
means for comparing each of the retrieved frames with a predetermined face template to determine one or more head poses that are monitored successfully and obtain head pose information of the determined one or more head poses; and
means for reconstructing, during the step of comparing, the face template from the obtained head pose information;
wherein the reconstructed face template is compared with subsequently retrieved images such that the head poses of the user are tracked in time.

In further aspect of the present application, the application further discloses a computer-implemented method for tracking a head pose of a user, comprising:
detecting that a user is located in an image capturing area for a RGB-Depth camera;
retrieving a plurality of frames of images of the user in response to the detecting;
comparing each of the retrieved frames with a predetermined face template to determine one or more head poses that are monitored successfully and obtain rotation information and translation information of the determined one or more head poses, such that a plurality of frames for reconstructing the face template is selected by:
checking, from the determined one or more head poses, a head pose is located in a preset effective fitting zone;
selecting the frame corresponding to the checked head pose as a frame to be selected; and
updating the effective fitting zone according to the checking results;
wherein the steps of checking, selecting and updating are repeated until no head pose is located in the updated effective fitting zone, such that all frames are selected;
reconstructing, during the step of comparing, the face template from the obtained rotation information and translation information of the selected plurality of frames;
wherein the reconstructed face template is compared with subsequently retrieved images such that the head poses of the user are tracked in time.

From the proposed method and apparatus, the face template reconstruction can be conducted during the head pose tracking without interfering with the real-time tracking performance.

The proposed method for head pose tracking with online face template reconstruction is accurate, real-time and robust and can be used in many applications. For example, the method can be used in free-viewpoint video display to determine the user's viewpoint, in human-computer interaction in which the head rotations are used to control the cursor's movement, and can be used in augmented reality applications, e.g., visually replacing the user's face with a computer graphic object.

DRAWINGS

Exemplary non-limiting embodiments of the present invention are described below with reference to the attached drawings. The drawings are illustrative and generally not to an exact scale. The same or similar elements on different figures are referenced with the same reference numbers.

DETAILED DESCRIPTION

Figure 1:
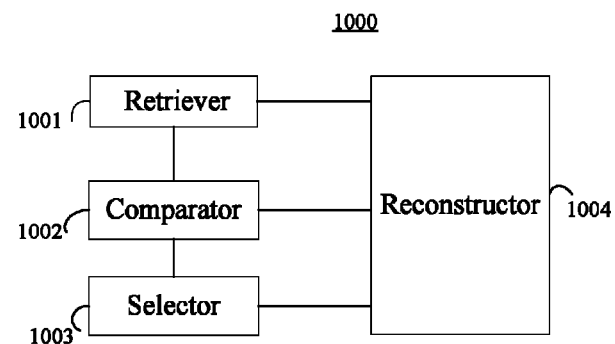
FIG. 1 is a schematic diagram illustrating an apparatus for tracking a head pose according to one embodiment of the present application.

References will now be made in detail to exemplary embodiments, examples of which are illustrated in the accompanying drawings. When appropriate, the same reference numbers are used throughout the drawings to refer to the same or like parts. FIG. 1 is a schematic diagram illustrating an exemplary apparatus 1000 for tracking a head pose consistent with some disclosed embodiments.

It shall be appreciated that the apparatus 1000 may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes.

Figure 2:
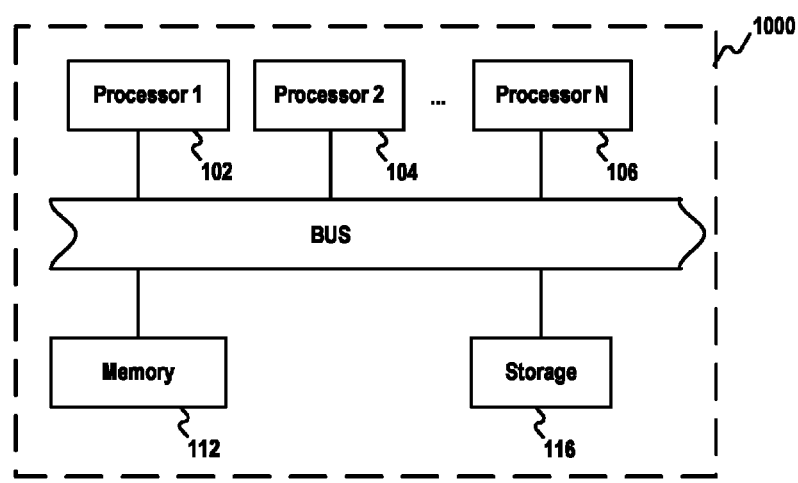
FIG. 2 is a schematic diagram illustrating an apparatus for tracking a head pose when it is implemented in software according to one embodiment of the present application.

In the case that the apparatus 1000 is implemented with software, the apparatus 1000 may include a general purpose computer, a computer cluster, a mainstream computer, a computing apparatus dedicated for providing online contents, or a computer network comprising a group of computers operating in a centralized or distributed fashion. As shown in FIG. 2, the apparatus 1000 may include one or more processors (processors 102, 104, 106 etc.), a memory 112, a storage 116, a communication interface 114, and a bus to facilitate information exchange among various components of the apparatus 1000. Processors 102-106 may include a central processing unit ("CPU"), a graphic processing unit ("GPU"), or other suitable information processing apparatus. Depending on the type of hardware being used, processors 102-106 can include one or more printed circuit boards, and/or one or more microprocessor chips. Processors 102-106 can execute sequences of computer program instructions to perform various methods that will be explained in greater detail below.

Memory 112 can include, among other things, a random access memory ("RAM") and a read-only memory ("ROM"). Computer program instructions can be stored, accessed, and read from memory 112 for execution by one or more of processors 102-106. For example, memory 112 may store one or more software applications. Further, memory 112 may store an entire software application or only a part of a software application that is executable by one or more of processors 102-106. It is noted that although only one block is shown in FIG. 1, memory 112 may include multiple physical apparatus installed on a central computing apparatus or on different computing apparatus.

Referring FIG. 1 again, where the apparatus 1000 is implemented by the hardware, it may comprise a retriever 1001 configured to retrieve a plurality of frames of images of the user. For example, the retriever 1001 may retrieve a video including a plurality of successive frames of images. The image includes color and depth images and may be captured by any available RGB-Depth camera. The camera may be located in front of the user and faces the user's head.

As shown in FIG. 1, the apparatus 1000 may further comprise a comparator 1002 and a reconstructor 1004. The comparator 1002 may compare the image of each frame retrieved by the retriever 1001 with a predetermined face template to determine one or more head poses that are monitored successfully (also referred to "tracked successfully" herein) and obtain head pose information of the determined one or more head poses. The reconstructor 1004 may reconstruct the face template from the obtained head pose information. To reconstruct the face template, a deformable 3D face model can be used to generate a plurality of different face templates. The face template reconstructed by the reconstructor 1004 may be compared with images retrieved subsequently by the retriever 1001, so as to monitor (i.e., track) the head poses of the user in real time. The head pose information may comprise translation information and rotation information. Herein, a rigid head pose movement with 6 degrees of freedom, including translations (forward/backward, up/down, and left/right) and rotations (pitch, yaw, and roll) in a 3-dimentional (3-D) space may be tracked.

As shown in FIG. 1 again, the apparatus 1000 may further comprise a selector 1003. The selector 1003 may select a frame in which a head pose is firstly monitored successfully, such that the face template may be reconstructed from the head pose information of the selected frame. In an embodiment of the present application, the selector 1003 may select a plurality of frames for reconstructing from the determined one or more head poses by checking a head pose is located in a preset effective fitting zone; selecting the frame corresponding to the checked head pose as a frame to be selected; and updating the effective fitting zone according to the checking results, and repeating the above steps until no head pose is located in the updated effective fitting zone. The effective fitting zone is preset by depth translation and yaw rotation information. The detailed information on the effective fitting zone will be discussed below.

Figure 4:
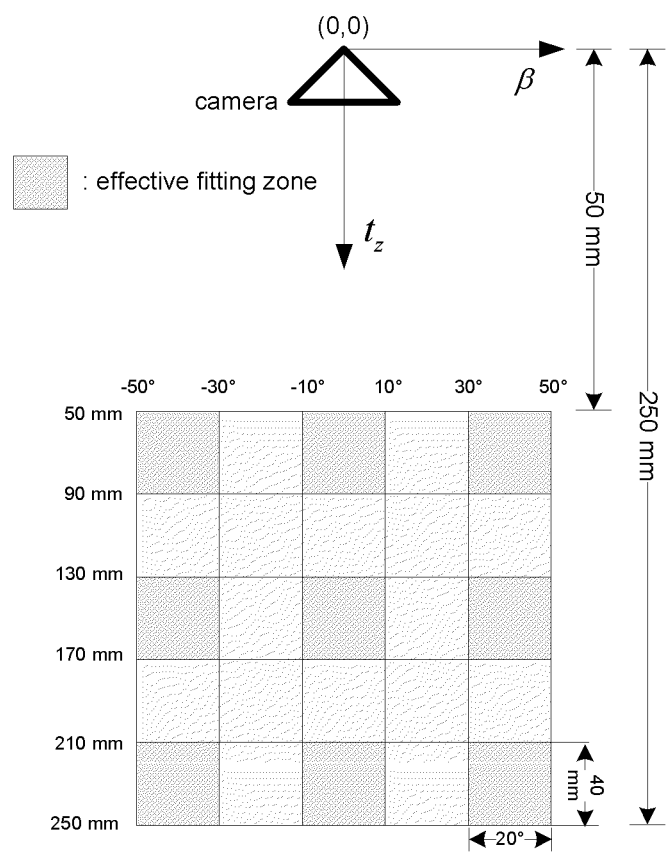
FIG. 4 is a schematic diagram illustrating an example of effective fitting zones according to one embodiment of the present application.

The essence of the above frame selection process is how to properly define and update the effective fitting zones. An embodiment of the effective fitting zones is shown in FIG. 4. The effective fitting zone is defined by using only $t_z$ (depth translation) and $\beta$ (yaw rotation) of a 2-dimensinal subspace. The other information of the head pose is not used. For example, there are 9 effective fitting zones as shown in FIG. 4. Although effective fitting zones with specific sizes are shown in FIG. 4, it should be understood by the skilled in the art that these arrangements are of exemplary embodiments only, and any other applicable arrangements will not be excluded. As to the update of the effective fitting zones, once a head pose in any effective fitting zone is used, this effective fitting zone will become ineffective, and all the effective fitting zones with larger $t_z$ (i.e., larger depth values) will become ineffective. From this, appropriated number of the head pose can be selected for the subsequent reconstruction process.

In the embodiment as shown in FIG. 4, at least 3 frames and at most 9 frames are used for the subsequent face template reconstruction process. Because the depth noise is stronger when depth value is larger, effective fitting zones with larger depth values than that of the current head pose are not used for the subsequent process. For accurate face template reconstruction, it is better to use frames with less depth noises.

Figure 3:
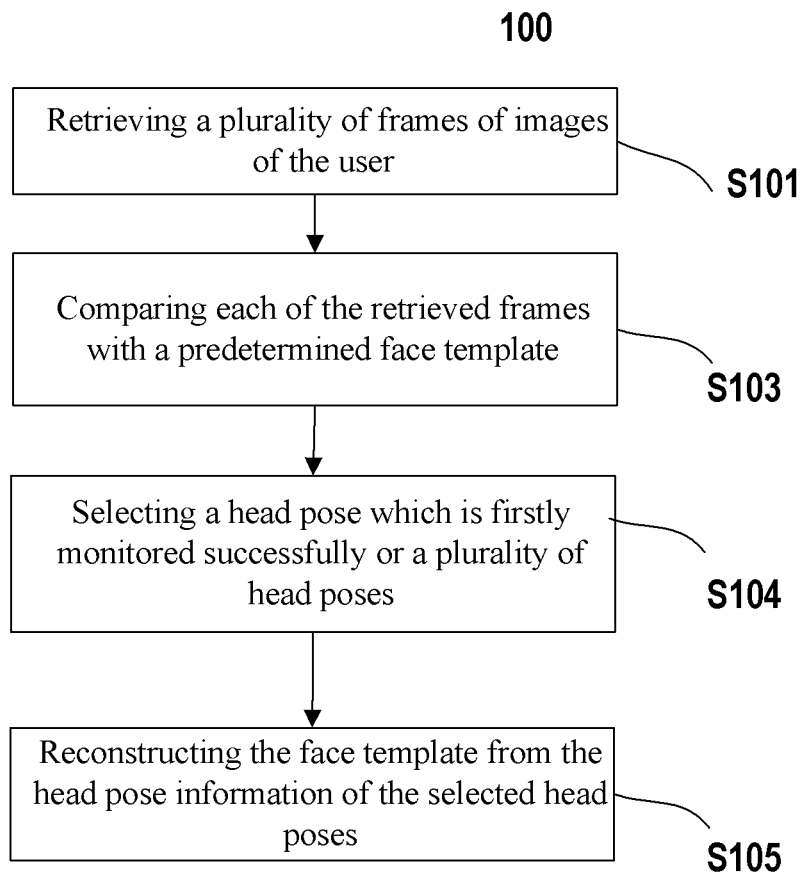
FIG. 3 is a schematic diagram illustrating a method for tracking a head pose according to one embodiment of the present application.

FIG. 3 shows a flowchart illustrating a method for tracking a head pose of a user consistent with some disclosed embodiments. In FIG. 3, a process 100 comprises a series of steps that may be performed by one or more of processors 102-106 or each module/unit of the apparatus 1000 to implement a data processing operation. For purpose of description, the following discussion is made in reference to the situation where each module/unit of the apparatus 1000 is made in hardware or the combination of hardware and software.

The process 100 begins with step S101, in which the retriever 1001 may retrieve a plurality of frames of images of the user. And then, in step S103, the comparator 1002 may compare the retrieved image of each frame with the predetermined face template to determine one or more head poses that are monitored successfully and obtain head pose information of the determined one or more head poses. For example, when a new user just comes, a general face template (i.e., mean face of a face model) will be used by the comparator. Herein, the general face template may be generated by any available deformable face model and any conventional and suitable template that is available to the retriever 1001.

According to an embodiment of the present application, the head pose information may comprise translation information and rotation information. Herein, a rigid head pose movement with 6 degrees of freedom, including translations (forward/backward, up/down, and left/right) and rotations (pitch, yaw, and roll) in a 3-dimentional (3-D) space may be tracked. During the comparing, the reconstructor 1004 may reconstruct from head pose information of the determined one or more head poses in step S105. That is, the step S105 is performed during the step S103 by a background process, so that it does not hinder the real-time head pose tracking. At step S105, a user-specific face template can be obtained to get accurate head pose. The face template reconstruction process is implemented by deforming such as a 3D deformable face model to fit the incoming color and depth images. After step S105, the reconstructed user-specific face template may be compared with subsequently retrieved images, such that the head poses of the user can be tracked in real-time. From the process 100, a user-independent face template can be reconstructed during the head pose tracking without interfering with the real-time tracking performance. The step of S103 will be discussed in detail below.

According to an embodiment of the present application, in the step S103, for each point of the face template, a matching point is searched in the retrieved image to form a matching point pair. Then, matching errors of the matching point pairs are calculated, and then the head pose of the next frame may be estimated by minimizing sum of the calculated matching errors. In an embodiment of the present application, translation and rotation matrices are used to embody the head pose to be tracked.

According to an embodiment of the present application, an iterative closest point (ICP) algorithm is used to calculate the translation and rotation matrices that align the retrieved images with the predetermined face template. Although the ICP algorithm will be described in the comparing process, it should be understood by the skilled in the art that the following descriptions are of exemplary embodiments only, and any other applicable algorithms will not be excluded.

Generally, the face template consists of a plurality of 3-D vertices, which can be considered as a point cloud in the 3-D space, and the image may be transformed into another 3-D point cloud. In an embodiment of the present application, for each point in a point cloud, its closest point (nearest neighbor) in the other point cloud is found by using the ICP algorithm to determine a point correspondence. To reduce computational complexity, a perspective projection method may be used to find point correspondences. Then, corresponding point pairs may be rejected according to a rule, for example, when the distance between the two corresponding points exceeds a predefined threshold value, the corresponding point pairs are rejected.

Then, for the frame k (in the $k^{th}$ iteration), the found corresponding pairs $(f_i, d_i^{(k)})$, $i \in [1, 2, \ldots, N]$ may be used to calculate a sum of matching errors of N points, i.e., $c(R^{(k)}, t^{(k)})$, so as to obtain the 3×1 translation ($t^{(k)}$), and 3×3 rotation ($R^{(k)}$) matrices of the head pose of the frame.

In particular, the translation and rotation matrices may be calculated by minimizing an energy function below:

$$\min_{R^{(k)}, t^{(k)}} c(R^{(k)}, t^{(k)}) = \min_{R^{(k)}, t^{(k)}} \Sigma_{i=1}^{N} [(R^{(k-1)} n_i) \cdot R^{(k)} f_i + t^{(k)} - d_i^{(k)}]^2 \quad (1)$$

where, $R^{(k-1)}$ represents the (known) 3×3 rotation matrix in the previous iteration (k−1);

$f_i$ represents a 3×1 point of the face template;

$d_i^{(k)}$ represents the corresponding 3×1 point from the image;

$n_i$ represents a 3×1 unit normal vector of the face template at point $f_i$; and operator "·" denotes an inner product between two vectors.

In contrary to conventional methods in which the sum of squared distances are minimized without using the normal vectors $n_i$, the above process by using Eq. (1) can calculate the translation and rotation matrices more accurately.

In addition, the above-mentioned sum $c(R^{(k)}, t^{(k)})$ can be used to determine whether the head pose of the current frame is monitored successfully. According to an embodiment of the present application, for each frame, a hybrid method is used to determine three possible tracking results, i.e., success, failure or suspect. In particular, if the calculated sum of the matching errors is smaller than a small threshold, the head pose of the current frame is monitored successfully, and then the current head pose may be selected to reconstruct the face template. If the sum is larger than a large threshold, it will be determined that the head pose of the current frame is not monitored successfully and the head pose is then initialized for the next frame. If the calculated matching error is in the middle, it will be determined that the tracking result of the current frame may be marked as being suspicious, and it will be further analyzed by a known facial feature detection algorithm. If the facial feature detection is completed and the head pose of the current frame is determined as failure, the current frame is skipped and head pose is reinitialized. To avoid slowing down the tracking speed, the facial feature detection method may be implemented as a background process by using the multi-threading technique.

The above hybrid method combines a time-efficient threshold method and a facial feature detection method. For the threshold method, it is difficult to determine the threshold value since the tracking error is distance and pose dependent. Compared to the time-efficient threshold method, the facial feature detection method is more timeconsuming (more than 30 ms per frame) but less affected by the head depth and rotation variations. By combining them together, efficiency and robustness can be achieved by the above hybrid method.

According to an embodiment, the head pose for each frame may be initialized depending on whether or not the previous head pose tracking results are available, so that the initialized information may be used to estimate more accurate head pose. When the previous head pose tracking results are not available, the head pose information may be initialized by, such as, a known detector-based head pose estimation method. Otherwise, the head pose information of the previous frames which have been monitored successfully may be used to monitor the head pose in the current frame.

In an embodiment of the present application, the process 100 may further comprise a step S104. Referring FIG. 3 again, in step S104, a frame in which a head pose is firstly monitored successfully or a plurality of frames may be selected for reconstructing the face template, which will be discussed in details.

For the one selected frame, its rotation information and translation information have been obtained in step S103. For one frame, all points in the face template share the same rotation and translation information. Then, in step S105, a weight is assigned for each point of the face template, in which a larger weight is assigned to a facial feature point of the face template. Then, a face changing magnitude of the face template may be determined by using the rotation and translation information of the selected frame and the assigned weights. In this connection, the reconstruction of the face template can start as soon as possible. The earlier a user-specific face template is reconstructed, the faster an accurate head pose tracking performance will be provided.

In order to select a plurality of frames, in step S104, whether a head pose of one frame is located in a preset effective fitting zone is checked firstly. And then, the frame corresponding to the checked head pose is determined as a frame to be selected and the effective fitting zone is updated according to the checking results. The above steps of checking, selecting and updating are repeated until no head pose is located in the updated effective fitting zone.

For the selected plurality of frames, their rotation information and translation information have been obtained in step S103. In step S105, a weight may be assigned for each point of the face template, in which a larger weight may be assigned to a facial feature point. Then, for each frame, the face changing magnitude of the face template may be determined by using the obtained rotation information and translation information of the selected frames and the assigned weights. Then, the determined magnitudes of the selected plurality of frames are accumulated to reconstruct the face template. Note that, if only one frame is used for template reconstruction, the step of accumulating may be omitted.

In particular, as mentioned above, a deformable 3D face model may be used to generate a plurality of different face templates. A new face template can be constructed by changing a face model parameter vector a, that is, the parameter vector a should be determined for the face template. Herein, the parameter vector of the face model is a K×1 vector. The face model is a PCA-based model comprising: the mean value (or the mean face, or the general face template used in this method), principle components, and standard deviation along the principle component directions. The parameter vector represents the principle component coefficients. As for the physical meaning, the face model parameter vector refers to the "face changing magnitude" along these face changing directions.

For the selected head pose, the parameter vector may be calculated by minimizing the following energy function:

$$\min_{R,t,a} c(R, t, a) = \min_{R,t,a} \sum_{i=1}^{M} w_i [(Rn_i) \cdot (R(\mu_i + P_i a) + t - d_i)]^2 + \lambda \sum_{j=1}^{K} \frac{a_j^2}{\sigma_j^2} \quad (2)$$

where,

R and t represent the 3×3 rotation and 3×1 translation matrices, respectively;

a represents the K×1 parameter vector of the face model, K is the dimension of the parameter space;

$\mu_i + P_i a$, $i \in [1, 2, \ldots, M]$ represents the PCA-based face model, in which $\mu_i$ represents the 3×1 position of the vertex of the mean face, $P_i$ represents a 3×K principle component matrix of the $i^{th}$ face vertex;

$d_i$ represents the corresponding point from the depth image;

$n_i$ represents the 3×1 unit normal vector of the $i^{th}$ face vertex;

$w_i$ is a scalar weighting factor for each face vertex; and operator (·) denotes the inner product between two vectors.

Here, since all transformation matrices including rotation and translation matrices are from the current iteration, for purpose of notation clarity, the superscripts are omitted in Eq. (2). Each vertex of the face template is rotated and translated $R(\mu_i + P_i a) + t$ to match its corresponding point $d_i$ in the image. By calculating the inner product, the matching error between two points $R(\mu_i + P_i a) + t$ and $d_i$ is projected to the normal direction of the $i^{th}$ face vertex.

In Eq. (2), $w_i$ may be used to exclude a part of the face vertices (by setting $w_i = 0$). Only part of the face vertices are used because the face model may have highly dense vertices which are redundant when the resolution of the face image is low. Using less face vertices can reduce computational complexity. Furthermore, some vertices cannot be used, for example, that in the hole regions (no depth value available) of the depth image, or occluded. Some vertices can be manually excluded, such as the chin and the mouth, since they can be easily affected by facial expression deformations. In addition, $w_i$ is used to emphasize the use of a vertex by setting $w_i$ a larger value. A known color-based facial feature detection method may be used to detect facial feature points, such as eye corners, mouth corners, nose tip, etc., and to emphasize their uses in face template reconstructing. Since human are extremely sensitive to facial features, by using these weights, the speed of face template reconstruction can be increased and the accuracy thereof can be improved.

In Eq. (2), $$\lambda \sum_{j=1}^{K} \frac{a_j^2}{\sigma_j^2}$$

represents a regularization term, in which $a_j$ represents the $j^{th}$ element of the parameter vector a; $\sigma_j$ represents the standard deviation of $a_j$ given by the face model; and $\lambda$ represents an empirical constant for determining the regularization strength. In this way, $$\sum_{j=1}^{K} \frac{a_j^2}{\sigma_j^2}$$

represents the Mahalanobis distance between the mean face and the new reconstructed face template in the parameter space, which should not be too large. Otherwise, the new face may look unnatural or distorted. The regularization term is added to constrain this distance.

The minimization given by Eq. (2) may be solved in an iterative process including two steps: (1) fixing face model parameter a, and using the ICP algorithm to calculate the rotation matrix R, translation matrix t, and finding the point correspondences; and (2) fixing the rotation matrix R, translation matrix t, point correspondences, and calculating the face model parameter a. This iterative process may be repeated predetermined times, such as 10.

On the one hand, when the face model parameter a is fixed, a vertex of the resultant face template can be represented by $f_i=\mu_i+P_i a$, and the minimization given by Eq. (2) can be reformulated as:

$$\min_{R,t} c_1(R, t) = \min_{R,t} \sum_{i=1}^{M} w_i[(Rn_i) \cdot (Rf_i + t - d_i)]^2 \qquad (3)$$

Eq. (3) can be linearized and solved analytically. Specifically, the objective function $c_1(R,t)$ in Eq. (3) can be reformulated as:

$$c_1(R, t) = \sum_{i=1}^{M} w_i[(Rn_i) \cdot (Rf_i + t - d_i)]^2$$

$$= \sum_{i=1}^{M} w_i[(Rn_i)^T (Rf_i + t - d_i)]^2$$

$$= \sum_{i=1}^{M} w_i[n_i^T (f_i + R^T t - R^T d_i)]^2$$

$$= \sum_{i=1}^{M} w_i[n_i^T (f_i + R^T t - R^T d_i)]^T [n_i^T (f_i + R^T t - R^T d_i)]$$

$$= \sum_{i=1}^{M} w_i(f_i + R^T t - R^T d_i)^T n_i n_i^T (f_i + R^T t - R^T d_i)$$

(notation: $W_i = w_i n_i n_i^T$)

$$= \sum_{i=1}^{M} (f_i + R^T t - R^T d_i)^T W_i (f_i + R^T t - R^T d_i)$$

(notation: $\tilde{R} = R^T, \tilde{t} = \tilde{R}t$)

$$= \sum_{i=1}^{M} (f_i + \tilde{t} - \tilde{R}d_i)^T W_i (f_i + \tilde{t} - \tilde{R}d_i)$$

The rotation matrix $\tilde{R}$ may be decomposed into an initial rotation matrix $\tilde{R}_0$ (the rotation matrix derived in the last iteration) and an incremental rotation matrix $\Delta\tilde{R}$, i.e., $\tilde{R}=\Delta\tilde{R}\tilde{R}_0$. Assume that the rotation angles ($\omega_1, \omega_2, \omega_3$) of $\Delta\tilde{R}$ are small, then $$\Delta\tilde{R} = \begin{pmatrix} 1 & -\omega_3 & \omega_2 \\ \omega_3 & 1 & -\omega_1 \\ -\omega_2 & \omega_1 & 1 \end{pmatrix}$$

Let $\omega=[\omega_1, \omega_2, \omega_3]^T$, $q_i=\tilde{R}_0 d_i=[q_{i1}, q_{i2}, q_{i3}]^T$ and $[q_i]_x$ denotes the skew-symmetric matrix of $q_i$, where $$[q_i]_x = \begin{pmatrix} 0 & -q_{i3} & q_{i2} \\ q_{i3} & 0 & -q_{i1} \\ -q_{i2} & q_{i1} & 0 \end{pmatrix}$$

then $c_1(R,t)$ can be further reformulated as:

$$\sum_{i=1}^{N} \left(f_i - q_i + [I_3, [q_i]_x]\begin{bmatrix} \tilde{t} \\ \omega \end{bmatrix}\right)^T W_i \left(f_i - q_i + [I_3, [q_i]_x]\begin{bmatrix} \tilde{t} \\ \omega \end{bmatrix}\right)$$

which is a quadratic function with respect to the unknown $[\tilde{t},\omega]^T$. Therefore, the unknown $[\tilde{t},\omega]^T$ can be calculated analytically:

$$\begin{bmatrix} \tilde{t} \\ \omega \end{bmatrix} = -\left(\sum_{i=1}^{M} A_i^T W_i A_i\right)^{-1} \left(\sum_{i=1}^{M} A_i^T W_i^T b_i\right)$$

where $A_i=[I_3,[q_i]_x]$ and $b_i=f_i-q_i$. Given $\omega$ and $\tilde{t}$, i.e., $\Delta\tilde{R}$, $\tilde{R}=\Delta\tilde{R}\tilde{R}_0$ and finally $R=\tilde{R}^T$, $t=R\tilde{t}$ calculated.

On the other hand, the parameter vector a of the face model may be calculated by fixing the rotation matrix R, translation matrix t, point correspondences and then minimizing Eq. (2). To be specific, Eq. (2) can be reformulated below:

$$\min_a c_2(a) = \min_a \sum_{i=1}^{M} w_i[(Rn_i) \cdot (R(\mu_i + P_i a) + t - d_i)]^2 + \lambda \sum_{j=1}^{K} \frac{a_j^2}{\sigma_j^2} \qquad (4)$$

Eq. (4) can be solved analytically. Firstly, the objective function $c_2(a)$ in Eq. (4) can be reformulated as:

$$c_2(a) = \sum_{i=1}^{M} w_i[(Rn_i) \cdot (R(\mu_i + P_i a) + t - d_i)]^2 + \lambda \sum_{j=1}^{K} \frac{a_j^2}{\sigma_j^2}$$

$$= \sum_{i=1}^{M} w_i[(Rn_i)^T(R(\mu_i + P_i a) + t - d_i)]^2 + \lambda \sum_{j=1}^{K} \frac{a_j^2}{\sigma_j^2}$$

$$= \sum_{i=1}^{M} w_i[n_i^T(P_i a + R^T(t - d_i) + \mu_i)]^2 + \lambda \sum_{j=1}^{K} \frac{a_j^2}{\sigma_j^2}$$

(notation: $g_i = R^T(t - d_i) + \mu_i$)

$$= \sum_{i=1}^{M} w_i[n_i^T(P_i a + g_i)]^2 + \lambda \sum_{j=1}^{K} \frac{a_j^2}{\sigma_j^2}$$

$$\left(\text{notation: } Q = \begin{bmatrix} \frac{1}{\sigma_1^2} & \cdots & 0 \\ \vdots & \ddots & \vdots \\ 0 & \cdots & \frac{1}{\sigma_k^2} \end{bmatrix}\right)$$

$$= \sum_{i=1}^{M} w_i[n_i^T(P_i a + g_i)]^2 + \lambda a^T Q a$$

$$= \sum_{i=1}^{M} w_i(P_i a + g_i)^T n_i n_i^T (P_i a + g_i) + \lambda a^T Q a$$

(notation: $W_i = w_i n_i n_i^T$)

$$= \sum_{i=1}^{M} (P_i a + g_i)^T W_i (P_i a + g_i) + \lambda a^T Q a$$

$$= \sum_{i=1}^{M} a^T(P_i^T W_i P_i + \lambda Q) a + 2 \sum_{i=1}^{N} g_i^T W_i P_i a + \sum_{i=1}^{N} g_i^T W_i g_i$$

Here, $c_2(a)$ is a quadratic function with respect to the parameter vector a. The analytical solution of Eq. (4) can be formulated as:

$$a = -\left(\sum_{i=1}^{M} P_i^T W_i P_i + \lambda Q\right)^{-1} \left(\sum_{i=1}^{M} P_i^T W_i^T g_i\right) \quad (5)$$

In this way, for each of the selected frames, the parameter vector of the face model is determined, that is, a user-specific face template is reconstructed. Then, the user-specific face template can be used to track the head pose of the user.

The weighting matrix in Eq. (5) is $W_i = w_i n_i n_i^T$. Similar to the above face template reconstructing, the facial feature points are assigned higher weights (i.e., larger $w_i$) to reconstruct them more accurately.

In Eq. (5), to reduce computational complexity, unit normal vectors $n_i$ of the previous face template are used to approximate that of the current one. As discussed before, given the face model parameter a, each vertex of the face template $f_i$, $i \in [1, 2, \ldots, M]$, can be given by $f_i + \mu_i + P_i a$. After the current face template is generated, the unit normal direction $n_i$ will be updated, by analyzing the connectivity of the face vertices. The connectivity information of the face vertices are provided by the face model. Specifically, three vertices make a triangular face. Each vertex may belong to several triangular faces. The face model provides connectivity information on how the vertices connect to form triangular faces. The normal direction of each vertex $n_i$ can be interpolated, e.g., by averaging the normal directions of the triangular faces that the vertex belongs to. To reduce computation time, the normal vector is not updated in the iterative optimization process, but is updated when the face template is reconstructed by using the above-mentioned accumulated information.

Eq. (5) shows how to calculate the parameter vector a by using one frame of head pose only. In Eq. (5) and the frame-dependent variable is $g_i$. For all selected head poses, the frame-dependent variables for the $i^{th}$ face vertex are represented by $g_{l,i}$:

$$g_{l,i} = R_l^T(t_l - d_{l,i}) + \mu_i \quad (6)$$

where,
l represents the frame index; and
$R_l$ and $t_l$ represent respectively the rotation and translation matrices of the $l^{th}$ frame.

As mentioned above, to handle the self-occlusion problem and to reduce noise level, multiple frames are selected for face template reconstruction. An average value of $g_i$ from the multiple frames is calculated by:

$$g_i = \sum_{l=1}^{L} g_{l,i} \quad (7)$$

Then, the calculated value in Eq. (5) is used to determine the face model parameter vector a. To reduce the memory use, the average value $g_i^{(L)}$ and the number of accumulated frames L are saved. When a new frame is selected, the number of accumulated frames will be increased by 1, and the average value will be updated memory-efficiently by a weighted combination:

$$g_i^{(L+1)} = \frac{L g_i^{(L)} + g_{L+1,i}}{L+1} \quad (8)$$

In the face template reconstructing process, firstly, the normal information in Eq. (2) is used to improve the reconstructing accuracy (similar method has been used in the ICP algorithm but not used in face template reconstructing). Secondly, the facial feature detection results are used to assign the weighting factor $w_i$ in Eq. (2), which makes the reconstructing process more correctly. Thirdly, the method for optimizing Eq. (2) consists of an iterative process of two steps. In each step, a time-efficient closed form optimization solution is provided, which makes the reconstructing process very fast.

According to an embodiment of the present application, the process of face template reconstruction may be evoked when a new user comes. In an embodiment, the process of reconstruction may be evoked by detecting the number of the frames in which head pose tracking has failed successively. A large number of successive tracking-failure frames normally indicate absence of a user. For example, a threshold value (i.e., 200) is defined. When the number of successive tracking-failure frames exceeds this threshold value, the reconstructing evoker will evoke the reconstructing process, so that when the next user arrives, a new face template will be reconstructed. This time-efficient method cannot distinguish different users but always assumes that the next user is different from the last one. However, it can make sure that a new face template can be reconstructed automatically for each user. On the other hand, the reconstructing process can still be evoked from a face recognition/ identification algorithm, or manually from a keyboard input or other types of human-computer interface.

It is worth noting that the face template reconstructing method can be implemented in a background process by using multi-threading techniques, so it does not slow down the head pose tracking. The disclosed face template reconstructing method is highly time-efficient. For each frame, it needs about only half a second (for example) to complete on a general-purpose CPU such as Intel i7 2.7 GHz. Typically only 3 to 9 frames are used, so the total reconstructing time is less than 5 seconds for each user.

In addition, the present application also provides a storage medium storing computer-implemented instructions for performing the above process 100.

Although the preferred examples of the present invention have been described, those skilled in the art can make variations or modifications to these examples upon knowing the basic inventive concept. The appended claims are intended to be considered as comprising the preferred examples and all the variations or modifications fall into the scope of the present invention.

Obviously, those skilled in the art can make variations or modifications to the present invention without departing the spirit and scope of the present invention. As such, if these variations or modifications belong to the scope of the claims and equivalent technique, they may also fall into the scope of the present invention.

What is claimed is:

1. A computer-implemented method for tracking a head pose of a user, comprising:
    retrieving a plurality of frames of images of the user;
    comparing each of the retrieved frames with a predetermined face template to determine one or more head poses that are monitored successfully and obtain head pose information of the determined one or more head poses;
    selecting a plurality of frames for reconstructing the face template by:
        checking, from the determined one or more head poses, a head pose is located in a preset effective fitting zone;
        selecting the frame corresponding to the checked head pose as a frame to be selected; and
        updating the effective fitting zone according to the checking results;
        wherein the steps of checking, selecting and updating are repeated until no head pose is located in the updated effective fitting zone, such that all frames are selected; and
    reconstructing, during the step of comparing, the face template from the obtained head pose information;
    wherein the reconstructed face template is compared with subsequently retrieved images such that the head poses of the user are tracked in time.

2. The method of claim 1, wherein the method further comprises, before the step of reconstructing:
    selecting a frame in which a head pose is firstly monitored successfully, so as to reconstruct the face template from the head pose information of the selected frame.

3. The method of claim 2, wherein the head pose information comprises rotation information and translation information, and the step of reconstructing comprises:
    assigning a weight for each point of the face template, wherein a larger weight is assigned to a facial feature point of the face template; and
    determining a face changing magnitude of the face template by using the rotation information and the translation information of the selected frame and the assigned weights to reconstruct the face template.

4. The method of claim 1, wherein the head pose information comprises rotation information and translation information, the step of reconstructing comprises:
    assigning a weight for each point of the face template, wherein a larger weight is assigned to a facial feature point of the face template;
    determining, for each of the selected frames, a face changing magnitude of the face template by using the rotation information, the translation information and the assigned weights, respectively; and
    accumulating the determined magnitudes from the selected plurality of frames to reconstruct the face template.

5. The method of claim 1, wherein the step of comparing further comprises, for each frame:
    searching, for each point of the face template, a matching point in the retrieved image to form a matching point pair;
    calculating matching errors for the searched matching point pairs; and
    estimating head pose of the next frame by minimizing sum of the calculated matching errors, such that the head pose the current frame is monitored.

6. The method of claim 5, wherein, for each frame,
    if the sum of the matching errors is smaller than a first threshold, it is determined that the head pose of the current frame is monitored successfully, such that the current frame is selected for reconstructing the face template; and
    if the sum of the matching errors is larger than a second threshold, it is determined that the head pose of the current frame is not monitored successfully, such that the head pose of the current frame is initialized,
    wherein the second threshold is larger than the first threshold.

7. The method of claim 1, further comprising:
    counting the number of the head poses that are not monitored successfully;
    wherein, when the number successively counted exceeds a threshold, the step of reconstructing is evoked.

8. The method of claim 1, wherein the comparing is implemented by iterative closest point (ICP) algorithm.

9. The method of claim 1, wherein a depth image is captured by a RGB-Depth camera.

10. The method of claim 9, further comprising:
    detecting the user is located in an image capturing area for the RGB-Depth camera so as to evoke the step of retrieving.

11. An apparatus for tracking a head pose of a user, comprising:
    a retriever configured to retrieve a plurality of frames of images of the user;
    a comparator configured to compare each of the retrieved frames with a predetermined face template to determine one or more head poses that are monitored successfully and obtain head pose information of the determined one or more head poses;
    a selector configured to select a plurality of frames for reconstructing the face template by:
        checking, from the determined one or more head poses, a head pose is located in a preset effective fitting zone;
        selecting the frame corresponding to the checked head pose as a frame to be selected; and updating the effective fitting zone according to the checking results;

wherein the steps of checking, selecting and updating are repeated until no head pose is located in the updated effective fitting zone, such that all frames are selected; and a reconstructor configured to reconstruct the face template from the obtained head pose information;

wherein the reconstructed face template is compared by the comparator with images retrieved subsequently by the retriever such that the head poses of the user are tracked in time.

12. The apparatus of claim 11, further comprising:
a selector configured to select a frame in which a head pose is firstly monitored successfully, such that the face template is reconstructed from the head pose information of the selected frame.

13. The apparatus of claim 11, wherein the head pose information comprises rotation information and translation information, and
the reconstructor is further configured to:
assign a weight for each point of the face template, wherein a larger weight is assigned to a facial feature point of the face template;
determine, for each of the selected frames, a face changing magnitude of the face template by using the rotation information, the translation information and the assigned weights, respectively; and
accumulate the determined magnitudes from the selected plurality of frames to reconstruct the face template.

14. The apparatus of claim 11, wherein the comparator is further configured to, for each frame:
search, for each point of the face template, a matching point in the retrieved image to form a matching point pair;
calculate matching errors for the searched matching point pairs; and
estimate head pose of the next frame by minimizing sum of the calculated matching errors, such that the head pose is monitored.

15. The apparatus of claim 14, wherein the comparator is further configured to:
determine the head pose of the current frame as a head pose which is monitored successfully, if the sum of the matching errors is smaller than a first threshold; or
determine the head pose of the current frame as a head pose which is not monitored successfully, if the sum of the matching errors is larger than a second threshold, wherein the second threshold is larger than the first threshold.

16. The apparatus of claim 11, further comprising:
a counter configured to count the number of the head pose that is not monitored successfully; and
an evoker configured to evoke the reconstructor to reconstruct the face template,
wherein, when the number successively counted by the counter exceeds a threshold, the reconstructor is evoked by the evoker.

17. The apparatus of claim 11, wherein the comparator is implemented by performing iterative closest point (ICP) algorithm.

18. The apparatus of claim 11, wherein the retriever is a RGB-Depth camera and the apparatus further comprises:
a detector configured to detect a user is located in an image capturing area for the RGB-Depth camera; and
an evoker configured to evoke the retriever to retrieve an image when the user is detected by detector to be located in the image capturing area.

19. A computer-implemented method for tracking a head pose of a user, comprising:
detecting that a user is located in an image capturing area for a RGB-Depth camera;
retrieving a plurality of frames of images of the user in response to the detecting;
comparing each of the retrieved frames with a predetermined face template to determine one or more head poses that are monitored successfully and obtain rotation information and translation information of the determined one or more head poses, such that a plurality of frames for reconstructing the face template is selected by:
checking, from the determined one or more head poses, a head pose is located in a preset effective fitting zone;
selecting the frame corresponding to the checked head pose as a frame to be selected; and
updating the effective fitting zone according to the checking results;
wherein the steps of checking, selecting and updating are repeated until no head pose is located in the updated effective fitting zone, such that all frames are selected;
reconstructing, during the step of comparing, the face template from the obtained rotation information and translation information of the selected plurality of frames;
wherein the reconstructed face template is compared with subsequently retrieved images such that the head poses of the user are tracked in time.

* * * * *